July 18, 1967  LE ROY G. HOFFMAN  3,331,413
MULTIPLE GROOVE APPARATUS AND METHOD
Filed Dec. 7, 1965  4 Sheets-Sheet 1

INVENTOR.
LEROY G. HOFFMAN
BY
Ralph R Roberts
AGENT

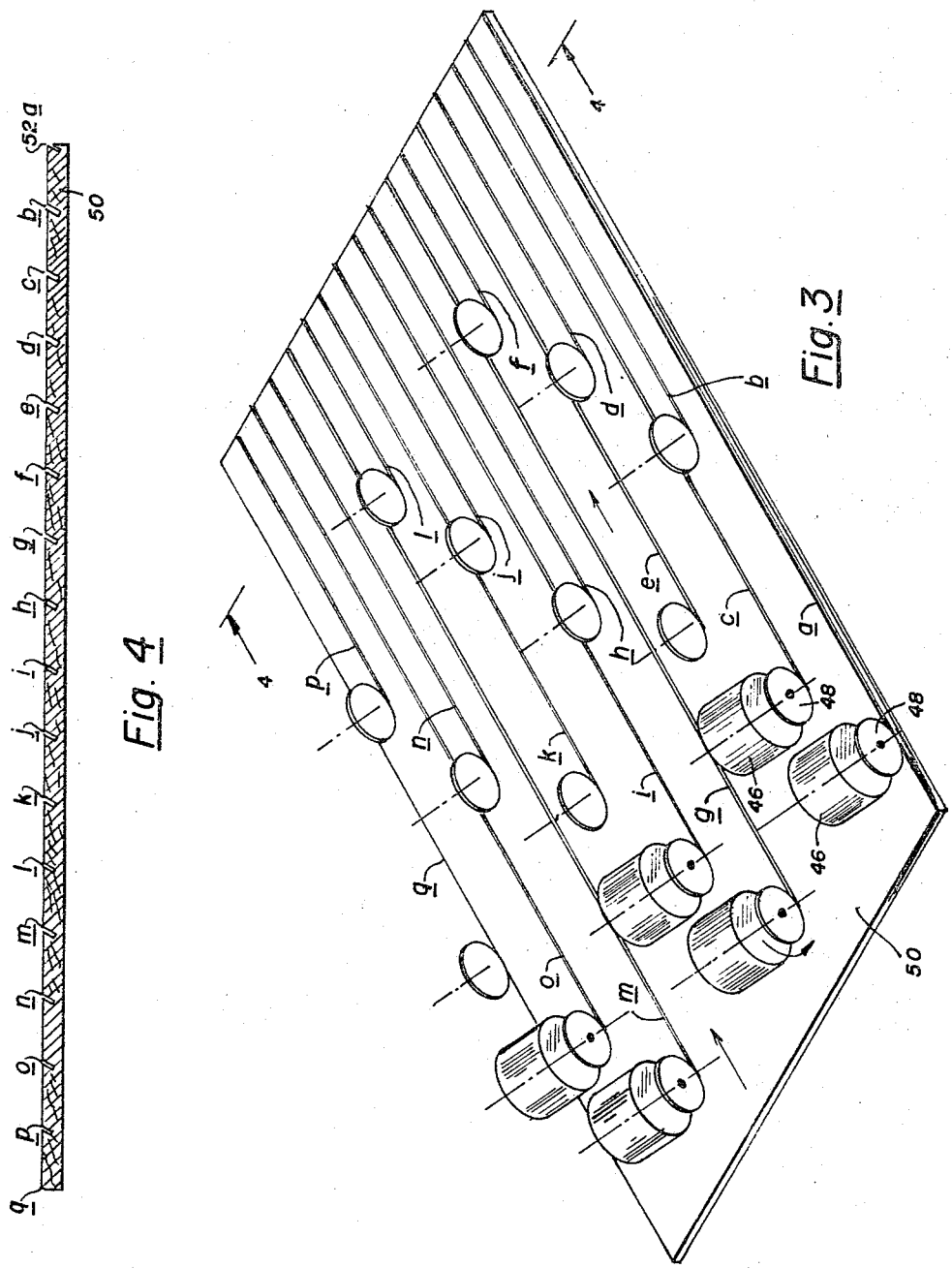

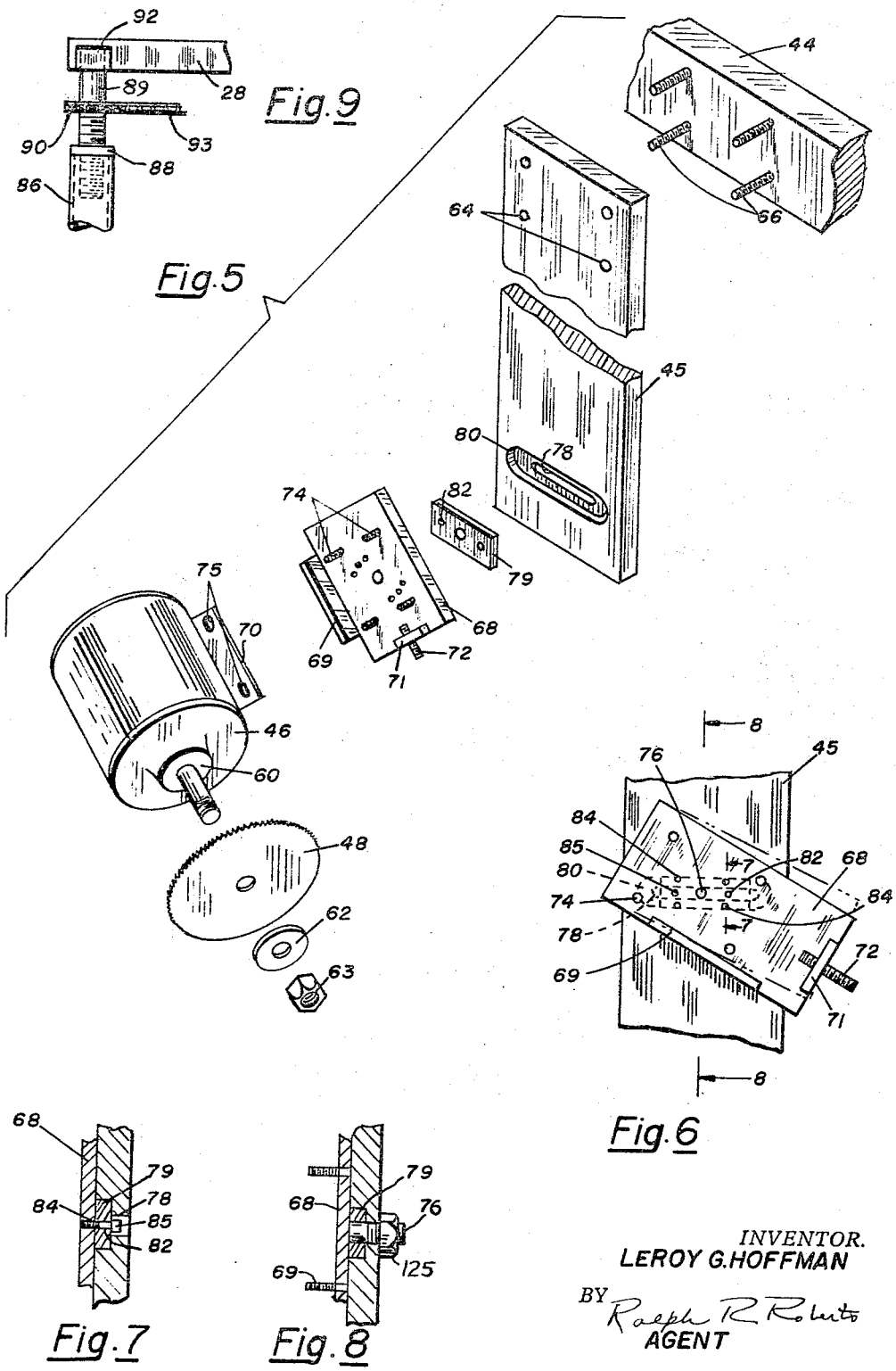

July 18, 1967 LE ROY G. HOFFMAN 3,331,413
MULTIPLE GROOVE APPARATUS AND METHOD

Filed Dec. 7, 1965 4 Sheets-Sheet 4

INVENTOR.
LEROY G. HOFFMAN
BY
Ralph R Roberts
AGENT

United States Patent Office 3,331,413
Patented July 18, 1967

3,331,413
MULTIPLE GROOVE APPARATUS AND METHOD
Le Roy G. Hoffman, 17 Kenneth Road,
Upper Montclair, N.J. 07043
Filed Dec. 7, 1965, Ser. No. 512,091
13 Claims. (Cl. 144—323)

ABSTRACT OF THE DISCLOSURE

An apparatus and method for forming a multiplicity of like shaped and spaced grooves in wood paneling, wherein panels one-at-a-time are fed to and in the way of rotatably driven saw blades, each disposed to cut a groove in the panel at a determined depth and at an included angle of between forty-five and seventy degrees with the face of the panel.

This invention relates to the apparatus for and the method of providing multiple grooves in wood paneling and the like. In particular this invention relates to apparatus for and the method of forming precisely spaced grooves having their side walls disposed at an included angle of forty-five to seventy degrees with the face of the panel.

Even more particularly my invention relates to apparatus for the forming at substantially the same time a multiplicity of slots or grooves having a precise selected spacing. These grooves each having a precise cross-section and having side walls disposed at an included angle greater than forty-five degrees with the face of the panel and usually formed in a plywood panel having a decorative face and of a thickness of one-half inch or more.

Decorative paneling for the walls of offices, stores and the like is often used to provide walls of both beauty and utility. When it is desirable to provide shelves, brackets and the like on these walls, it is often an advantage to have these attachments mounted in a readily removable manner and by a method whereby the paneling is not damaged. Paneling of such a type may be of plywood having grooves or holes for the mounting therein of metal forms. Where the engaging means in the paneling is grooves it is desirable that such means be of a preselected form so as to engage and support a hook member in a predetermined manner and with a determined tightness. It is also of great importance that the panels be made so as to fit and match when the wall requires the use of many panels.

It is therefore an object of this invention to provide apparatus that will produce grooves in panels of plywood and the like, the grooves to be at an included angle to the face of the panel which is greater than forty-five degrees. The apparatus is further adapted to produce a series of precisely spaced grooves of predetermined cross-section and a multiplicity of these grooves to be produced at the time of making a single pass of the panel through the apparatus.

It is a further object of my invention to provide apparatus adapted to produce grooves in panels of plywood and the like, the grooves to be of like size and depth and to be equally and evenly spaced so that when panels are assembled in multiples either in end-to-end relationship and/or in side-to-side relationship, the grooves in the end-to-end assembly will match and provide continuous grooves while panels in side-to-side relationship will provide for predetermined precise arrangements of mounting of hooks. This mechanism further provides for the production of grooves in paneling with a minimum of expenditure of labor per unit and with the scrap and damage rate at a quite low percentage. It is further contemplated that this mechanism will provide for adjustments so that the angle of any of the grooves may be selectively changed, the thickness of the panel may be changed, and the depth of groove may be changed.

In the attainment of these and other objects I provide a mechanism in which there are multiplicity of saw-type cutters each mounted on an individual arbor, each arbor preferably lying in a plane perpendicular to the path of the surface of the panel to be grooved. Each arbor is preferably driven by a separate power means and is adjustable within selected limits in regards to its angle to the plane of the panel path and is adjustable, within limits, to provide a precise depth into the path of the panel. This mechanism in the preferred embodiment includes seventeen motors each carrying a saw blade of determined width and of approximately the same diameter. Each motor is adjustably carried on a support member which is removably and precisely mounted on a support frame. Front and rear conveying frames are adjustably disposed to dispense and receive the panels as they are fed in to the mechanism and a center support member under the saws is preferably selectively adjustable in its distance from the saws to its support surface. An infeed and outfeed roller mechanism is each adapted to be driven to produce a like rate of longitudinal movement to the engaged panel and to engage and feed each panel as it enters, moves through and leaves the groove producing section.

For a better understanding of the present invention, together with other and further objects thereof, reference is made to the following detailed description, taken in connection with the accompanying drawings, and its scope will be pointed out in the appended claims.

Referring now to the drawings:

FIGURE 3 is a somewhat diagrammatic isometric view showing the arrangement of the motors and saws as they form a multiplicity of grooves in a panel and with some of the motors omitted for the purpose of showing the full pattern of production of the grooves;

FIGURE 4 is a section of the panel downstream of the saws and taken on the line 4—4 of FIG. 3;

FIGURE 5 is an isometric exploded view showing the preferred means for mounting and adjusting a single sawing unit of the apparatus;

FIG. 6 is a fragmentary front view showing the motor support and adjusting means;

FIG. 7 is a fragmentary sectional view taken on the line 7—7 of FIG. 6 and showing a lateral slide and clamp;

FIG. 8 is a fragmentary sectional view taken on the line 8—8 of FIG. 6 and showing the pivot pin and clamp;

FIG. 9 is a fragmentary side view showing in enlarged scale a means of precisely raising and lowering of the roller conveyor frames;

Figure 1:
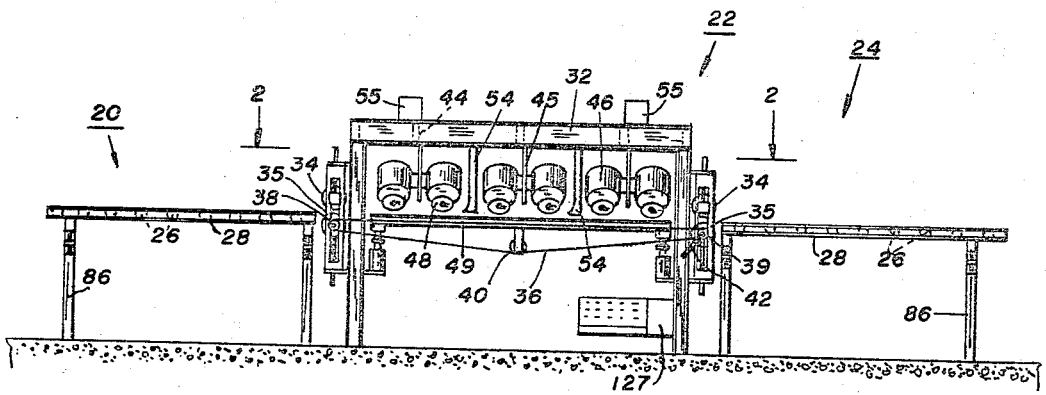
FIGURE 1 is a side view of the general arrangement of the apparatus of my invention.
Figure 2:
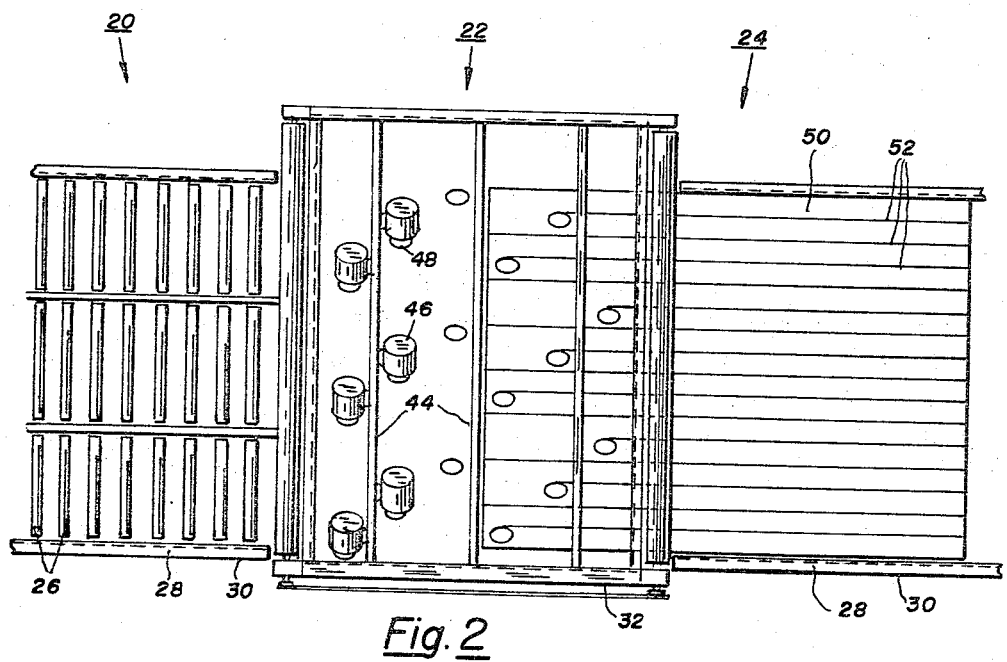
FIGURE 2 is a plan view of mechanism taken on the line 2—2 of FIG. 1.

Referring now to the drawings in which like numerals refer to like components and in particular to FIGS. 1 and 2, there is shown an infeeding platform 20, a groove forming mechanism 22 and an outfeeding platform 24. In the preferred embodiment both the infeeding platform 20 and the outfeeding platform 24 are roller conveyor platforms having rollers 26 carried in a frame 28 and having a side guide 30 mounted on each side of the platform. The side guides are adapted to be adjustable so as to provide a precise alignment of the edges of a panel as it is fed through the apparatus. The heights of the platforms 20 and 24 are precisely adjusted and aligned by means to be discussed below in conjunction with FIG. 9. The mechanism 22 is carried in a frame 32 and has mounted thereon a pair of feed rollers 34 and 35. These rollers are mounted on the outside of the frame and are adjustable by means more fully shown in relation to FIG. 10 as described below. The bottom rollers 35 are adjustably mounted so as to be movable up and down so that the outer surface may be brought into the plane of support provided for the bottom surface of the panel. These lower rollers 35 as well as the upper rollers 34 are preferably formed with a resilient sheath or cover so as to provide engaging friction, reduce the possibility of damage to the surface of the panels and adjust to the inaccuracies of the manufacture of the panel. The lower rollers 35 are connected by a roller drive chain 36 running over sprockets 38 and 39 maintained at the desired tension by means of an idler sprocket 40. As exemplified, a crank 42 is mounted in conjunction with the right hand roller 35 and by chain 36 to turn both of the rollers 35. A motor and appropriate drive may be used instead of the crank 42 to turn the rollers 35. Attached to and providing a portion of the upper part of frame 32 are cross beams 44 and from these beams are hung motor supports 45 upon which are mounted motors 46 and saws 48. Below saws 48 and carried by the frame is a center support 49 which is adjustably movable in respect to the frame. This support 49 carries the panel as it passes through the groove forming mechanism 22. Also seen in FIG. 2 is the groove panel 50 lying upon the outfeeding platform 24 and with the grooves 52 shown formed therein.

Figure 15:
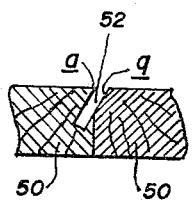
FIG. 15 is an enlarged fragmentary sectional view showing a groove formed by the two longitudinal edges when the panels are assembled in side-by-side relationship.

As seen in FIGS. 3 and 4, the panel 50, which may be of plywood about one-half inch thick and conventionally be four feet wide by eight feet long, is passed under seventeen saws 48 each carried and powered by a motor 46. In the preferred embodiment each groove 52 is precisely spaced three inches apart, with the first groove 52a being formed in the extreme right hand edge. As the motors 46 occupy more than three inches of space each, they are arranged in alternate rows and as viewed, the first row of three motors reading from the left, carry saws 48 which form grooves a, g and m while the next row of three motors carry saws forming grooves c, i and o. The motors for the saws in the following rows are not shown as the motors, if shown, would tend to obscure the grooves however each saw is preferably powered by a motor 46 such as shown in the first rows and to be more completely described below. The third row of motors and saws form grooves e, k and the bevel edge q whereby, when the panel grooves e, k and the bevel edge q, when the panel is assembled as in FIG. 15, the bevel edge q and the groove formed by cut a provides a complete groove 52. The next row of motors and saws form grooves b, h and n while the next row of motors and saws form grooves d, j and p. The final row of motors and saws form grooves f and l.

Figure 14:
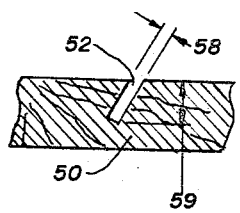
FIG. 14 is an enlarged fragmentary sectional view showing a typical groove formed in a portion of a panel.

This arrangement of motors and saws, as reduced to practice, permits a suction pipe 54 (FIG. 1) to be mounted adjacent and downstream of each saw and to be carried to a suction chamber 55 mounted on the top of frame 32. The suction chamber provides means for removing the produced sawdust from the panel and to carry this sawdust to conventional collector means not shown. It is to be noted that the preferred rotation of the saws as indicated by the arrows is with the advancement of the panel instead of against the advancement of the panel. For the purposes of description I call this "climb sawing." Such an arrangement provides the benefits of requiring less power to rotate the saws in the wood, it drastically reduces the amount of force necessary to advance the panel through the apparatus, and finally, as the saws rotate, the teeth engage the uncut portion of wood and urge the panel downwardly. Hold-down members not shown may be used to reduce vibration in the panel as it is grooved, however, this dampening requirement has proved to be only the most minimal and has been primarily a safety feature. Hold downs are helpful to insure that the panel 50 is pressed down against the center support 49 at the time the leading and trailing edges of the panel approach the first row of saws and leave the last row of saws. It is to be noted in FIG. 14 that the saw 48 is made to provide a groove 52 whose width 58 is preferably about three thirty-seconds inches wide and whose depth 59 is about five-sixteenths inch. This groove when made with a saw blade whose teeth is precisely set to extend only three thirty-seconds of an inch in width produces a groove only a few thousandths of an inch wider than the saw blade. This is true when the axis of the arbor is precisely at right angles to the travel path of the panel through the apparatus.

Referring now to FIGS. 5 through 8 it is to be noted that the preferred means of mounting the motor 46 and saw 48 includes an arbor 60 mounted on the shaft of the motor and a flange 62 and nut 63 by which the saw is mounted on the arbor. Support 45 has four accurately located holes 64 which are sized and spaced to fit on a group of four studs 66 selectively mounted in beams 44. Beams 44 have the groups of studs 66 extending either forwardly or rearwardly so that for example the motors 46 that are disposed to cut grooves a, g and m will be supported on studs 66 extending forwardly, while the motors 46 that are disposed to cut grooves c, i and o are supported on studs 66 extending rearwardly. An adjustable mounting plate 68 is made with a guide 69 with which to engage the side of the motor mounting plate 70. A front stop 71 has an adjusting screw 72 mounted therein, the screw 72 adapted to engage the front of the plate 70. Mounted in the plate 68 are four studs 74 extending outwardly and spaced to accept slots 75 in the plate 70. Nuts not shown are threadedly mounted on studs 74 after the motor has been placed on the plate 68 with slots 75 mating with studs 74. Guide 69 insures that the motor although movable on the studs 74 is only movable in the line of direction established by the guide 69 and slots 75. Adjusting screw 72 may be manipulated to provide the desired forward limit of the motor on plate 68. Extending rearwardly from plate 68 is stud 76 which is slidable in a slot 78 in the rear of plate 45. A plate 79 is pivotally mountable on stud 76 and is slidable in a forward slot 80 formed in plate 45. A clearance hole 82 is provided in plate 79 at a selected distance on each side of stud 76. At a like distance from stud 76 and at a variety of predetermined angular relationships to the center line of plate 68 there is provided a plurality of tapped holes 84. A cap screw 85 enters hole 82 and is threaded into and tightened in one of the threaded holes 84 in plate 68.

Figure 10:
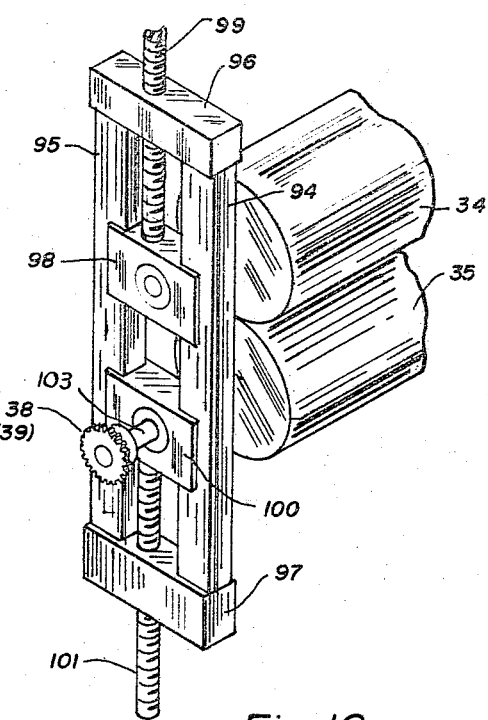
FIG. 10 is a fragmentary side view showing in enlarged scale the arrangement and drive of the rollers used for the infeeding and outfeeding of the panels to the groove producing portion of the apparatus.

In FIG. 9 is shown a leg 86 which provides a corner support for the frame 28 of the infeeding platform 20 and for the outfeeding platform 24. In the top of this leg 86 there is retained a threaded shoulder member 88 which is rotatable in the leg 86. A threaded shaft 89 is mounted in member 88 and has a roller chain sprocket 90 attached to the shaft 89. The frame 28 has a bushing 92 mounted therein, the bushing retaining the upper end of shaft 89 while permitting the shaft to rotate freely therein. Each of the four legs 86 supporting each frame 28 is made in this manner. Connecting and driving the four sprockets 90 is a roller chain 93 which may be moved by a hand driven sprocket not shown or may be In FIG. 10 is shown the adjusting means for the upper and lower rollers 34 and 35. Mounted on frame 32 are slide members 94 and 95 having upper and lower threaded thrust members 96 and 97. A bearing block 98 slidable in the slide members 94 and 95 is selectively positioned by an adjusting screw 99 and carries the upper roller 34. Bearing block 100 is also slidable in members 94 and 95 and is selectively positioned by means of adjusting screw 101. A shaft 103 carries roller 35 and also carries either sprocket 38 or 39 and when it is intended to use a crank 42 or other drive means this shaft is further extended for the mounting thereon of the crank 42.

Figure 11:
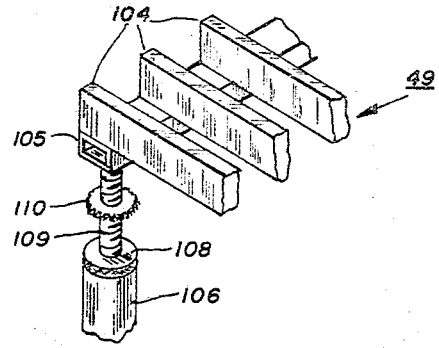
FIG. 11 is a fragmentary view showing in enlarged scale a means for precisely raising and lowering the intermediate panel support member.

In FIG. 11 is shown the center support 49 which may be a series of metal ribs 104 welded to a support end 105. A support leg 106 has a threaded shoulder member 108 which is rotatably retained in leg 106. A threaded shaft 109 is mounted in member 108 and carries an attached roller chain sprocket 110. The upper end of shaft 109 is rotatably retained in a bushing means (not shown) in support end 105. As in FIG. 9 the four sprockets 110 used in the support of the four corners of the center support 49 are connected by a roller chain which may be moved by a separate sprocket, and air cylinder or a motor not shown.

Figure 12:
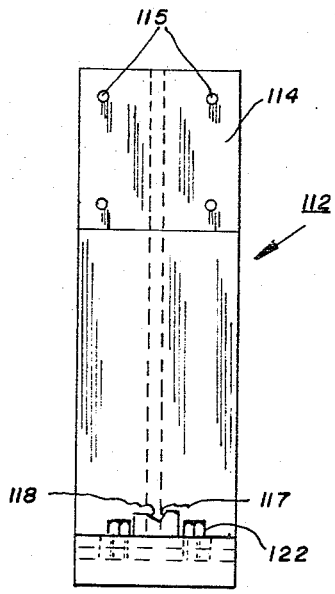
FIG. 12 is a front view of a setting frame for the precise adjustment of a saw.
Figure 13:
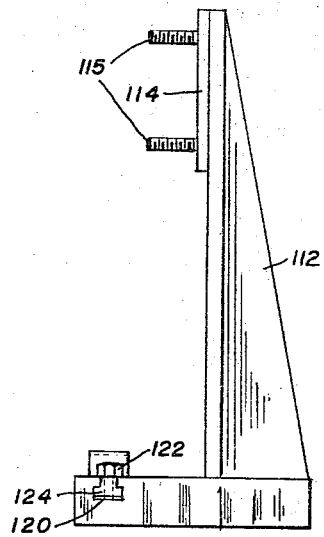
FIG. 13 is a side view of the setting frame of FIG. 12.

In FIGS. 12 and 13 are shown a setting gauge whereby the motor and saw can be precisely set and then mounted in the apparatus without the necessity of further adjustment. A frame 112 is formed with a mounting plate 114 having studs 115 extending therefrom. Studs 115 are sized and spaced to precisely fit the holes 64 in support 45 (FIG. 5) and with the plate 68 set at the desired angle by the engagement and tightening of cap screw 85 in one of the selected holes 84 the motor 46 is then mounted on studs 74. Block 116 is formed with sloped surfaces 117 and 118 formed on the upper end thereof these surfaces providing slopes against which the operator can set the side of the saw blade and the teeth of the saw blade 48. Block 116 is movable above a T-slot 120 formed in the bottom table portion of frame 112. This block 116 is clamped in a selected position to provide a fixed setting of the saw, the clamping being done by means of screws 122 which in the present instance are threaded in a T-block 124 attached to and carrying block 116. Block 116 is preferably replaceable and can be formed and changed to suit each determined operating condition. Once block 116 is clamped in place and the support 45 is bolted on studs 115 the motor may be moved back and forth horizontally by loosening nut 125 on stud 76. Adjustably sliding the plate 68 and motor 46 horizontally and moving the motor on the studs 74, provides means for moving the periphery of the saw into alignment with the surfaces 117 and 118. By this means is accommodated the variations of the saw diameter caused by manufacture and sharpening. By setting each motor and saw to the fixed setting of block 116 each saw will be at the exact same depth and spaced at the same relationship to the holes 64 in support 45.

*Use and operation*

The operation and method of producing panels having parallel grooves by means of the apparatus described above includes the selecting of the angle for the operation of the saw and for adjusting the apparatus to produce the desired depth of cut. The saw blade 48 is precisely set as to depth and angle by means of the gauge of FIGS. 12 and 13. Each motor is mounted and tightened in place and then support 45 is attached to one of the beams 44. These beams 44 are sized and spaced so that each group of studs are precisely spaced so as to provide a predetermined distance from an adjustable side guide. Each group of studs are precisely spaced in relation to each of the other group of studs so that when a support 45 is mounted on a beam 44 the motor and saw blade 48 will be precisely positioned at a predetermined angle and with all the blades at a determined engaging plane. The motors 46 are hooked up to a power source and may be individually controlled from switches mounted on a console panel 127 as seen in FIG. 1. The infeeding platform 20, the outfeeding platform 24 and the center support 49 are all adjusted as described above to a selected height which is a predetermined distance below the plane of the low point of the periphery of the saw 48. The lower rollers 34 are adjusted so that their upper surfaces coincide with the plane of the adjusted infeeding platform 20, outfeeding platform 24 and center support 49. As thus adjusted in the manner discussed above, the platforms, support and rollers provide a precise plane for the panel 50 to be fed into and through the grooving apparatus. Rollers 35 are adjusted to engage the upper surface of the panel as it is fed through the apparatus, the rollers 35 urge the panel against the outer surface of roller 34 so that a sufficient amount of friction is developed for roller 34 to precisely control the advance of the panel as rollers 34 are rotated.

With the apparatus adjusted as above, the panel 50 is placed on platform 20, is then fed to and through the left or upstream pair of rollers 34 and 35. As crank 42 is turned the panel is passed under and through a portion of the periphery of the saws and the grooves 52 are formed in the upper surface of the moving panel. As the leading edge of the panel enters the right hand or downstream pair of rolls 34 and 35 the panel is gripped and is continued to be fed through the grooving section. As the trailing edge of the panel leaves the left pair of rolls the right pair of rolls continue control of the advance of the panel until the panel leaves the right hand or downstream pair of rolls and is deposited on the downstream platform 24.

It is to be noted that when the motor is mounted with the mounting plate 70 on the upstream side, the adjustable mounting plate 68 is made as a mirror image of the plate 68. It is further noted that threaded shoulder members 88 and threaded shoulder member 108 are rotatably retained in their respective legs so that the relation of the threaded shafts 89 and 109 may be advanced or retarded to provide individual adjustment of the corners of the support section and the platforms so that a precise plane of support can be provided prior to rapid adjustment. The use of a crank 42 for powering the lower rolls 34 is a matter of preference as any power means can be used. The feeding means for the panel 50, in the preferred embodiment described above, uses friction developed by resilient surfaces on rollers 34 and 35. This type of drive is felt to be less susceptible for causing damage to the apparatus or panel than a drive means using a positive advance such as a chain with engaging lugs and the like. Such advancing means could be employed and is contemplated in the concept of this invention. It is to be further noted that rollers 34 and 35 could be used having or not having a resilient cover but having the upper roller 34 urged downwardly by a spring or springs of determined bias. These springs would thus be able to provide the desired frictional enengagement of the rollers on the panel.

*Method*

The above apparatus provides not only the means for producing a grooved panel but also a novel method for producing the grooved panel of FIG. 4. The method of producing the paneling includes the steps of *arranging* a panel to lie in a predetermined plane; *feeding* the panel while in said plane into, through and out of a groove forming means; *forming* at least one groove in one face of the panel as it is fed through the grooving means, the groove so formed being disposed at an included angle of forty-five degrees to seventy degrees to the face of the panel and being formed as the panel is advanced through the grooving means; and *removing* the panel from the plane after the panel has been grooved.

It is to be noted that the terms "in," "out," "top," "bottom," "right" and "left" and similar terms are applicable to the apparatus as described in conjunction with the accompanying drawings and that such terms are merely for the purpose of description and do not necessarily apply to a position in which the apparatus may be constructed or used.

The invention in its broader aspects is not limited to the specific combinations shown and described but departures may be made therefrom within the scope of the accompanying claims, without departing from the principles of the invention and without sacrificing its chief advantages.

What I claim as my invention is:

1. In an apparatus for the production of a plurality of similar grooves in the face of a wood panel and the like, the panel being fed sequentially into and through the apparatus, each groove as it is formed having one side wall disposed at an included angle between the limits of forty-five and seventy degrees to the face of the panel, and including a transporting means for feeding the panel to, thence through a like portion of the peripheral path of each of a plurality of selectively spaced saw blades and finally from the path of the saws, each of the saw blades driven at a selected speed, wherein the grooving apparatus comprises: (a) a pair of inlet and a pair of outlet rollers each infinitely and positively adjustable within determined maximum limits toward and away from each other and each roller adjustable toward and away from a given support plane, one of each of the pairs of rollers rotated to provide a positive and controlled means for advancing a panel through the apparatus when the rollers have been adjusted to positive positions to provide a space therebetween, said space being less than the maximum thickness of the panel so that the panel is gripped with a tractive effect as it is passed through each each set of rollers; (b) a center support between the pairs of inlet and outlet rollers and adapted to provide a support surface for establishing and maintaining the paneling on a determined support plane as the panel is passed through the apparatus, and (c) for each saw blade a separate arbor disposed at an angle between the limits of twenty and forty-five degrees included angle to the face of the panel as it is moved through the apparatus.

2. Apparatus for the production of a plurality of similar grooves as in claim 1 in which there is additionally provided side guides for each side of a panel to maintain the panel in alignment with the path of travel, the side guides formed so at least at selected points there is provided clearance for those saw blades forming at least portions of grooves in and near those edges of the panel aligned with the grooves in the panel.

3. Apparatus for the production of a plurality of grooves in wood paneling and the like, said apparatus comprising: (a) an infeed means for receiving, guiding and advancing in a determined plane and path said panel of selected size, the infeed means including a pair of rollers having means for positively adjusting the distance between the rollers to provide therebetween a space less than the thickness of the maximum thickness of the panel and to thereby provide a selected tractive engagement of the panel, and means for driving one of the rollers of the infeed pair at a determined speed; (b) a center support adjacent the infeed means and adapted to provide a support surface for establishing and maintaining said panel in a determined path and plane as it is passed through the apparatus; (c) an outfeed means for receiving, guiding and advancing in a determined plane and path said panel as it is received from the center support as and after it has been passed through the apparatus, the outfeed means including a pair of rollers having means for positively adjusting the distance between the rollers to provide therebetween a space less than the thickness of the maximum thickness of the panel and to thereby provide a selected tractive engagement of the panel, and means for driving one of the rollers of the infeed pair at a determined speed; (d) a plurality of saw blades each disposed on a separate arbor and at an angle between the limits of twenty and forty-five degress included angle to the face of the panel and at a predetermined distance from the determined support plane, the cutting means on each blade disposed so as to engage a portion of the panel as it is transported in said plane; and (e) means for driving each saw blade at a selected speed so that as the panel is transported in said support plane, said panel is brought in the way of the blades with each blade forming a like sized groove in the face of the panel, each groove as it is formed having at least one side wall disposed at an included angle of betwen forty-five and seventy degrees to the face of the panel.

4. Apparatus for the production of a plurality of similar grooves as in claim 3 in which there is additionally provided side guides for each side of the panel to maintain the panel in alignment with the desired path of travel.

5. Apparatus as in claim 3 in which the lower roller in each pair is mounted in means movable to bring the outer surface of the roller into the plane defining the path of the lower surface of the panel as it is moved in the apparatus, and in which there is an adjustable means providing for the biased urging of the upper roller toward the lower roller so that when the panel is brought between the rollers the panel will be maintained in a desired frictional engagement with the pair of rollers.

6. Apparatus as in claim 3 in which the rollers are provided with resilient covers, and in which the lower rollers are rotated in response to the same power means.

7. Apparatus as in claim 6 in which the infeed means and outfeed means are conveyor platforms and these platforms and center support are each provided with support members having means adjustable for bringing all the upper support surfaces into a common plane.

8. Apparatus as in claim 7 in which the infeed and outfeed platforms and the center support are provided with means operable to raise and lower the platforms and support to provide a new determined plane for the movement of the panel through the apparatus.

9. Apparatus as in claim 8 in which each motor is adjustably mounted on a support plate, said plate mounted so as to provide an adjustable means for changing the angle of the arbor and the blade mounted thereon in relation to the determined plane for the path of the panel.

10. Apparatus as in claim 9 in which each motor is mounted on means adjustable to permit the blade to be raised and lowered in relation to the plane of the path of the panel and with the means adjustable to permit the blade to be moved toward and away from the edge of path of the panel.

11. Apparatus as in claim 10 in which the motors are arranged in a plurality of rows and with each saw disposed to engage and form a groove in a different portion of the panel, each groove so formed being equidistant and parallel to an adjacent groove.

12. Apparatus as in claim 11 in which each of the saws are rotated so that they turn into and with the panel as it is advanced into and through the appartus.

13. The method of producing a grooved panel having a multiplicity of like sized grooves of like configuration and including the steps of: (a) arranging a panel to lie in a predetermined support plane on a support platform; (b) advancing the panel to a pair of inlet rollers adjustably and precisely spaced to provide a portion of the determined plane and a space therebetween less than the major thickness of the panel to provide a tractive gripping of the panel when brought therebetween; (c) rotating one of the rollers of the inlet pair to advance the panel; (d) guiding and advancing the panel on a center support section providing an intermediate portion having a plurality of saws determinedly spaced and adapted to cut grooves of like determined depths and at an angle such that one of the sides of the grooves is an included angle of between forty-five and seventy degrees; (e) continuing the advance of the panel to a pair of outlet rollers adjustably and precisely spaced to provide a portion of the determined plane and a space therebetween less than the major thickness of the panel to provide a tractive gripping of the panel when brought therebetween; (f) rotating one of the rollers of the outlet pair to control the advance of the grooved panel to a receiving platform, and (g) removing the grooved panel from the receiving platform.

References Cited
UNITED STATES PATENTS

| | | | |
|---|---|---|---|
| 205,382 | 6/1878 | Hanvey | 144—213 |
| 649,860 | 5/1900 | Oppert | 144—136 X |
| 1,820,445 | 8/1931 | Craft | 144—136 X |
| 2,455,097 | 11/1948 | Scianna | 143—36 X |
| 2,940,489 | 6/1960 | Feiner | 144—136 |
| 3,082,802 | 3/1963 | Dickson | 144—117 |
| 3,084,726 | 4/1963 | Dennison | 144—13 |
| 3,207,192 | 9/1965 | Dennison | 144—13 |
| 3,234,978 | 2/1966 | Stolesen | 143—38 |
| 3,259,157 | 7/1966 | Runnion | 144—41 |
| 3,299,922 | 1/1967 | Vonhof | 144—326 |

WILLIAM W. DYER, Jr., *Primary Examiner.*

R. J. ZLOTNIK, *Assistant Examiner.*